FIG. 2a
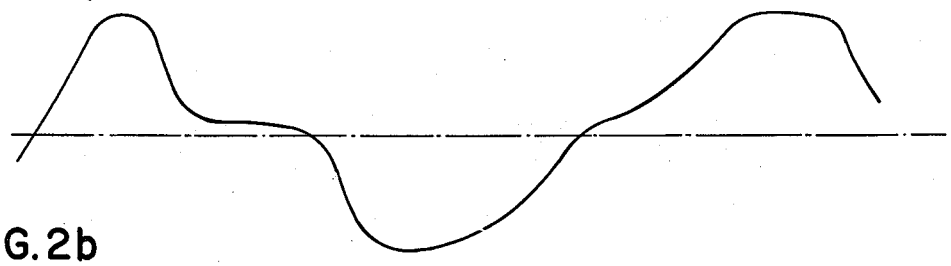
FIG. 2b
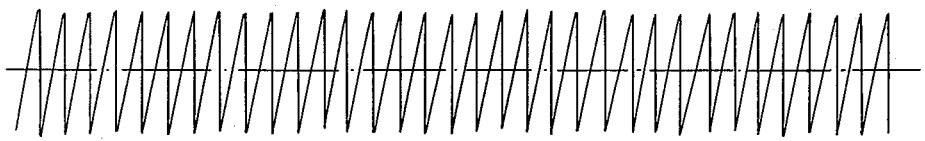
FIG. 2c
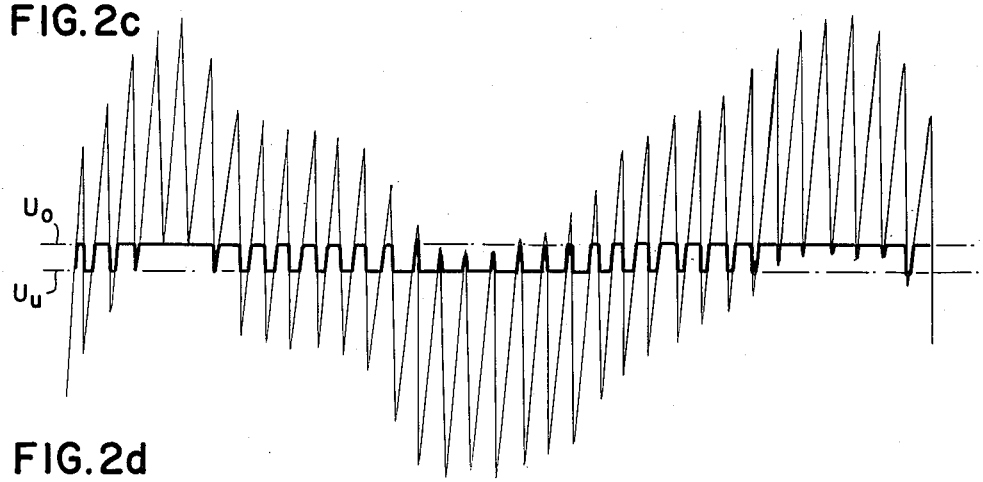
$U_o$
$U_u$
FIG. 2d
FIG. 2e 3,227,995
SYSTEM FOR RECORDING SONAR SIGNALS
ON RECORD CARRIER
Rudolf Rucklin, Kiel, Germany, assignor to Electroacustic Gesellschaft mit Beschrankter Haftung, Kiel, Germany, a corporation of Germany
Filed Mar. 28, 1963, Ser. No. 268,714
Claims priority, application Germany, Apr. 4, 1962,
E 22,668
7 Claims. (Cl. 340—3)

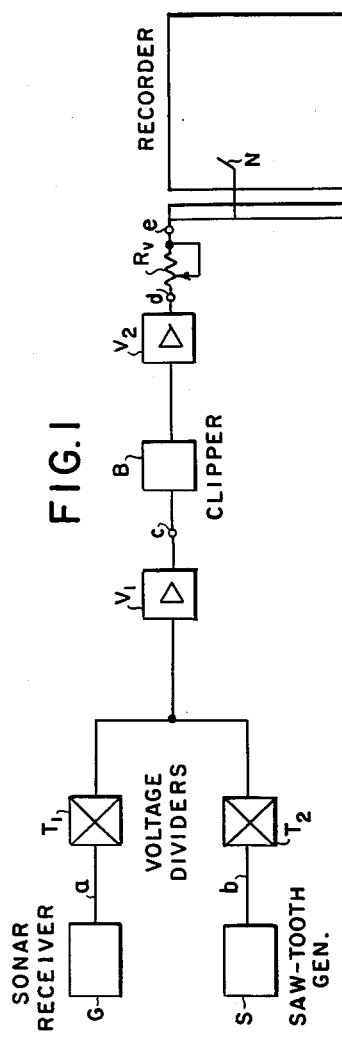
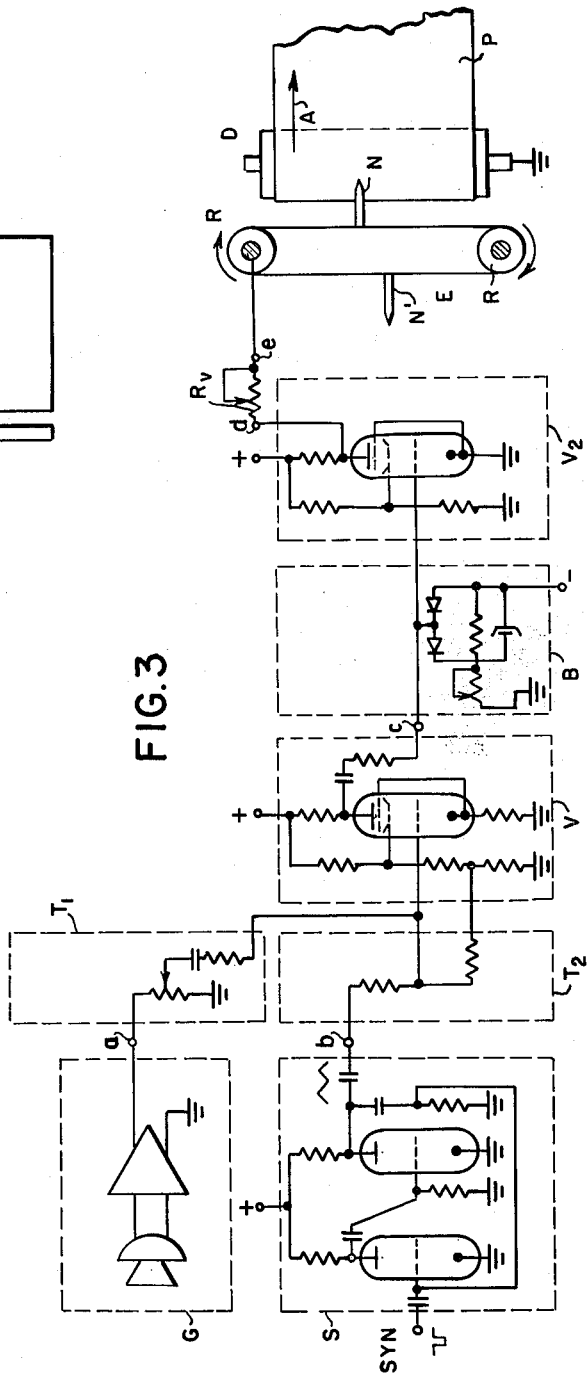

My invention relates to the graphic recording of data on electrically responsive surface members and, in a more particular aspect, to electrically operating sonic echo recorders for marine purposes.

Echo recorders used on fishing vessels for depth sounding and indicating schools of fish that may be located close to the sea bottom, have been equipped with electrically responsive recording paper. In these so-called spark-recorders, the recording paper becomes colored or discolored when a stylus, passing over the paper surface, transmits an electric current through the paper under control by an echo signal being received. This takes place while the stylus travels across the paper tape. The stylus may be mounted on an endless band trained about two rollers and extending perpendicular to the travel direction of the paper tape. When electric current passes from the stylus through the paper the paper is blackened and a recording mark is produced, provided the voltage applied between the stylus and a conductive backing exceeds a given value of approximately 60 volts. The entire blackening range from a just visible to a deeply dark mark corresponds to a relatively small range of applied voltage, for example a change in voltage within the ratio of approximately 1:3. This small ratio of the voltage range has the consequence that, when the recording system is set to produce a visible recording of objects, that result in an only weak recording mark, such as schools of fish near the sea bottom, the sea bottom itself is recorded in deep black since the echo reflected from the bottom is much more intense. The intensive recording current then overheats the paper so that it may commence to smolder and produce smoke, and the echoes from the sea bottom are recorded in excessive length so that the graphic record of the bottom merges with the rather feeble record of a school of fish closely above the bottom and consequently no longer discernible on the echogram. It has been attempted to minimize this disadvantage by giving the signal amplifier of the recording system a graduated gain so as to make the intensity of the recording marks less dependent upon increasing intensity of the echoes received.

Another known proposal to cope with the above-mentioned difficulty is to continuously vary the amplifying gain of the amplifier within given limits in accordance with a predetermined timing program whose cycle period differs from that of the pulse sequence.

Still another attempt to overcome the difficulties is to employ for recording of echo voltages an amplifier whose output voltage remains almost invariable for different input voltages within a voltage range whose upper limit corresponds to a selective critical value of input voltage. That is, the amplifier is so controlled that its output voltage increases at a much smaller rate than the input voltage so that the resulting recordings are produced with a certain, nearly uniform intensity, up to the selected limit, whereas any input voltages above the critical limit value results in a much larger amplifier output voltage to produce recording marks whose thickness is distinctly different from that of the marks normally produced.

All of the known recorders operating with current-responsive paper have the disadvantage that with this type of paper a variable phenomenon cannot be graphically represented in such a manner that each value of the phenomenon corresponds to a linearly correlated shade of gray. This is because the current intensity through the paper is different during increasing and decreasing voltage respectively, on account of the difference between the ignition, burning and extinction voltages. This is usually called a hysteresis effect. Another reason why the known systems cannot record gradually changing phenomena by correlated gray stages on electrically responsive paper is the fact that there is no linear relation between the gray value of discoloration and the amount of current flowing through the current or spark traversed paper.

It is an object of my invention to provide a recording system for operation with spark-recording or the like electrically responsive recording paper, particularly for submarine echo-sounding purposes, that minimizes the above-mentioned shortcomings of the known systems and also affords a satisfactory recording operation for a larger range of signal voltages than heretofore applicable. Another object of the invention is to obtain a recording performance substantially independent of the above-mentioned hysteresis effect.

To achieve these objects, and in accordance with a feature of my invention, I employ for inscribing recording marks on the electrically responsive paper or the like surface member a method according to which the variable-amplitude signals, particularly those from the receiving transducer of submarine echo-sounding equipment, are subjected to pulse-width modulation, also called pulse-duration modulation, and the resulting duration-modulated electric pulses are applied with constant current intensity to the current-responsive recording paper. The constant amplitude of the duration-modulated pulses for this purpose is so chosen that when the electrically responsive paper is being inscribed with markings, no widening of the intensely dark or black markings and no smoldering or smoke will occur.

One way of performing the recording method is the following:

Rectangular direct-voltage pulses whose leading edges follow in constant intervals of time, are modulated with respect to the time positions of their trailing edges in dependence upon the phenomenon or signal to be recorded, such as by the variable-amplitude signal voltages issuing from the receiving transducer of sonar equipment (pulse-width or pulse-duration modulation). The carrier pulses thus used and hence the pulse-sequence frequency (being the reciprocal value of the time spacing between the leading edges of two successive pulses) must be higher than the highest signal-variation frequency to be recorded.

Devices and electronic components for subjecting a voltage signal to pulse-duration modulation are known as such for telegraphic transmission of pictures in which half-tones are to be represented by telegraphic signals. For such purposes, there are known transmitting methods according to which different amplitude values are represented by duration-modulated pulses. In this respect, reference may be had, for example, to the book "Electronic and Radio Engineering" by F. E. Terman, published 1955 by McGraw-Hill Book Company Inc., New York, pages 967, 968; further to the book "Handbuch der Bildtelegrafie und des Fernsehens," by F. Schroter, published by Springer-Verlag, 1932, pages 339 to 344. Among the known pulse-duration modulating devices suitable for recording purposes according to the invention are those equipped with a multivibrator and a trigger pulse generator as shown in FIGS. 24–21 on page 967 of Terman, this device operating with rectangular carrier pulses as mentioned in the foregoing. Also applicable is a pulse-modulation method according to the one proposed by Alexanderson for picture transmission and described on pages 341 to 344 of Schroter as having become insignificant for picture transmission because it impairs the resolving power for details previously scanned in the transmitter, and also because it operates uneconomically in requiring an increased amount of transmitting time.

This normally obsolete method of Alexanderson, however, has been found to be particularly advantageous for the purpose of the present invention in conjunction with submarine sonar receiving recorders, in that it affords electrically inscribing current responsive paper in echo recorders with a considerably larger range of signal voltages then heretofore utilizable and without incurring undue widening of the recorded traces or causing smoldering of the paper at increased voltages. With graphic echo recorders, the method does not result in the disadvantages that have caused it to become obsolete for picture transmission. An increase in transmitting time is not required for recording of sonar echoes because the pulse-width modulation according to the invention is applied not in the remote transmission but entirely within the receiving system and subsequent to amplification of the received signals, thus permitting any desired widening of the frequency band within a portion of the receiving equipment, whereas in the method of Alexanderson the frequency band occurs within the transmitting medium and is greatly limited in width because of other transmitters operating on closely adjacent frequency bands. Furthermore, the working speed of sonar equipment is considerably lower than that of picture telegraphy. For these reasons the invention is especially well applicable and economical for sonar purposes, aside from the above-mentioned improvements with respect to recording operation.

The invention will be further explained with reference to the accompanying drawings showing, by way of example, an embodiment of a submarine sonar system for recording the echo signals received.

FIG. 1 is a block diagram of an embodiment of the receiving recorder system of the present invention;

FIG. 2 represents a family of interrelated explanatory graphs concerning the same system; and FIG. 3 is an electric circuit diagram of components applicable in the system of FIG. 1.

The same reference characters are used in FIGS. 1 and 3 for corresponding components respectively, and the letters "a" to "e" of FIG. 2 are also applied in FIGS. 1 and 3 at the localities to which the individual graphs of FIG. 2 are related.

The illustrated echo-receiving and recording system comprises a sonic echo receiver G which constitutes a sonic-electric transducer and whose output terminal or lead $a$ furnishes the signal voltage whose time curve may correspond to the one shown in graph $a$ of FIG. 2. The output line $b$ of a saw-tooth generator S furnishes a carrier pulse voltage whose frequency is high in comparison with the variation frequency of the signal voltage. The saw-tooth voltage is exemplified by graph $b$ in FIG. 2. The signal voltage $a$ and the saw-tooth voltage $b$ are applied to a mixer stage which comprises two potentiometers or voltage dividers $T_1$, $T_2$ and an amplifier $V_1$. The component voltages of the resultant amplifier input voltage are adjusted by means of the voltage dividers $T_1$ and $T_2$ so that the peak values of the signal voltage $a$ are substantially the same as the peak value of the saw-tooth voltage. The resulting modulated voltage, amplified by amplifier $V_1$, appears in the output line $c$ and is schematically represented by the modulated carrier wave according to graph $c$ in FIG. 2. This amplified voltage passes through an amplitude limiting stage B which clips all amplitude portions below a lower limit $U_u$ and above an upper limit $U_o$. The output voltage of the limited or clipper stage B, therefore, corresponds to the voltage curve indicated by a heavy line in graph $c$ of FIG. 2. This amplitude-limited output constitutes a duration-modulated pulse voltage which is further amplified in an amplifier stage $V_2$ so bias-adjusted that when the input voltage has the value $U_u$ (FIG. 2c) the output voltage of amplifier $V_2$ is 0 volt, and that when the input voltage is $U_o$, the output voltage of amplifier $V_2$ has a given value that corresponds to a multiple of the breakthrough voltage of the recording paper being used. The output voltage of amplifier $V_2$ thus corresponds to the duration-modulated pulse voltage shown in graph $d$ of FIG. 2. The edges of the pulses are here shown vertical, which nearly corresponds to reality because the ratio of the voltages in the input circuit of the limiter stage B to the voltage difference $U_o - U_u$ is in fact greater (for example about 15:1) than is shown on the drawing for purpose of illustration.

The output circuit of the amplifier $V_2$ is connected through a series resistor $R_v$ with the recording stylus N of the recorder. The resistor $R_v$ is so dimensioned or adjusted that a completely black recording track is marked on the electrically responsive paper when the amplifier $V_2$ furnishes the above-mentioned output voltage. Since this voltage is constant, the recorded trace has constant width. In this manner, there results on the paper a raster-type record as exemplified in the graph $e$ of FIG. 2, without excessive heating of the paper or development of smoke. Consequently, by the variable mutual spacings and lengths in the stylus-travel direction of the uniformly wide and deeply black lines, the recorded image exhibits varying degrees of gray shading due to a raster effect. That is, black or dark color in the raster appears when the recorded individual trace marks follow each other with no or only slight gaps, whereas different gray values appear in the echogram due to the more or less densely distributed arrangement of the marks.

Relative to the circuit diagram according to FIG. 3, it will be understood that the illustrated components and electronic circuits are known as such and may be substituted by other components known to be applicable, or may be given a different arrangement or interconnection. The particular saw-tooth generator S illustrated in FIG. 3 corresponds to one shown in "Handbuch für Hochfrequenz- und Elektro-Techniker," II. Vol., 1953, page 675. Supplied to the terminal Syn of the generator S in FIG. 3 are the pulses of a multivibrator. The sonic echo receiver G is shown to comprise a sonic-electric transducer and an amplifier which may both be of conventional type. The limiting stage B is exemplified by a network of negatively biased crystal diodes, but it may also be designed as an electronic tube circuit such as shown in FIG. 235 in the above-mentioned book of Schroter, page 341. The recording stylus N in FIG. 3 is schematically shown to be mounted on an endless belt E of conductive material which passes over guide rollers R driven in a constant speed relation to the travel speed of the electrically responsive recording paper P that passes in the direction of the arrow A over a rotating feeder drum D as the stylus N travels transverse to the paper feed direction. After stylus N has reached the end of its transverse travel, a second stylus N' commences its travel. The duration-modulated pulse voltages are applied between each active stylus and the conductive backing drum D to pass a marking pulse current through the paper. Thus an echogram is produced representing a chart of the area being sounded. It will be understood that various other echogram recorders are applicable, for example those known from U.S. Patents 2,944,868 and 2,946,647.

To those skilled in the art it will be obvious upon a study of this disclosure that my invention permits of a great variety of modifications with respect to the particular components and circuitry and hence may be given

I claim:

1. A system for recording signals of individual submarine sounding periods on moving electrically responsive record carriers, comprising a recording device having when in operation an electrically responsive surface member moving in a determined direction and having a marking stylus displaceable over said surface member to produce marks thereon successively and substantially perpendicularly to said determined direction, a signal receiver, a modulating network connected to said receiver and having a pulse generator and pulse-width modulating means for converting the received signals to width-modulated pulses of constant current amplitude, said network being connected to said stylus whereby said modulated pulses effect marking of said surface member successively and substantially perpendicularly to said determined direction.

2. A system for recording signals of individual submarine sounding periods on moving electrically responsive record carriers, comprising a recording device having when in operation an electrically responsive surface member moving in a determined direction and having a marking stylus displaceable over said surface member to produce marks thereon successively and substantially perpendicularly to said determined direction, a signal receiver furnishing a variable-amplitude signal voltage, a modulating network connecting said receiver with said recording device for applying signal-responsive marking voltage to said stylus, said network comprising a pulse-voltage generator having an output circuit connected with said receiver so as to impose pulse modulation upon said signal voltage, and said network having an amplitude limiter stage connecting said recorder stylus to the modulated voltage, whereby variable-amplitude signals are recorded by constant-amplitude pulses of variable pulse duration applied by said stylus to said surface member successively and substantially perpendicularly to said determined direction.

3. A system for recording sonar echo signals of variable intensity on electrically responsive record paper moving in a determined direction, comprising a recorder having a stylus and means for controlling said stylus to scan the paper surface for applying signal-responsive marking voltage thereto successively and substantially perpendicularly to said determined direction, a transducer for converting sonic echo signals to signal voltage, a modulating network connecting said transducer with said stylus, said network having pulse-width modulating means joined with said transducer for modulation of said signal voltage and having amplitude limiting means between said modulating means and said stylus, whereby echo signals of variable intensity are recorded by constant-amplitude pulses of variable duration applied by said stylus to said paper successively and substantially perpendicularly to said determined direction.

4. A system for recording sonar echo signals of variable intensity on electrically responsive record paper moving in a determined direction, comprising a recorder having a stylus and means for controlling said stylus to scan the paper surface for applying signal-responsive marking voltage thereto successively and substantially perpendicularly to said determined direction, a transducer for converting sonic echo signals to signal voltage, a modulating network connecting said transducer with said stylus, said network having a carrier pulse generator and having a mixer stage connected to said transducer and to said generator for furnishing a pulse-modulated voltage, and said network having an amplitude limiter stage connected between said stylus and said mixer stage, whereby echo signals of variable intensity are recorded by constant-amplitude pulses of variable duration applied by said stylus to said paper successively and substantially perpendicularly to said determined direction.

5. A system for recording sonar echo signals of variable intensity on electrically responsive record paper moving in a determined direction, comprising a recorder having a stylus and means for controlling said stylus to scan the paper surface for applying signal-responsive marking voltage thereto successively and substantially perpendicularly to said determined direction, a transducer for converting sonic echo signals to signal voltage, a modulating network connecting said transducer with said stylus, said network comprising a saw-tooth voltage generator, an amplifier, potentiometer means connecting said transducer and said generator to said amplifier whereby said amplifier receives a saw-tooth modulated signal voltage, said potentiometers being adjustable for setting the respective signal and saw-tooth components of said modulated voltages to approximately equal peak values, and said network further comprising an amplitude limiter stage connected between said amplifier and said stylus for eliminating amplitude peaks above and below given limits whereby said limiter stage furnishes duration-modulated pulses of constant amplitude to said stylus.

6. A recorder system according to claim 5, comprising another amplifier connected between said amplitude limiter stage and said recorder stylus and having a bias setting at which the bottom value of the modulated pulses corresponds substantially to zero output of the latter amplifier, and the peak value of said modulated pulses corresponds to an amplifier output voltage according to a given multiple of the critical breakdown voltage of said paper.

7. A recorder system according to claim 6, comprising an adjustable resistor connected between said other amplifier and said stylus for setting the amplifier output voltage at the stylus in accordance with a desired constant width of the recording marks to be produced.

References Cited by the Examiner

UNITED STATES PATENTS 2,902,657  9/1959  McCarter _____ 332—9
2,982,923  5/1961  Hibbard _____ 332—9

FOREIGN PATENTS 603,941  6/1948  Great Britain.

OTHER REFERENCES

"Electrical Recorder for Seismic Data," by C. F. Hadley et al., Geophysics, vol. 22, No. 4, October 1957, (pp. 829–834 relied on), 340–15.5.

CHESTER L. JUSTUS, *Primary Examiner.*